July 4, 1961 W. E. BANTON 2,991,436

ADJUSTMENT OF FREQUENCY SENSITIVE TRANSMISSION NETWORKS

Filed Sept. 11, 1958 2 Sheets-Sheet 1

INVENTOR
W. E. BANTON
By W. C. Parnell
ATTORNEY

| TEST NUMBER | BRIDGING TERMINAL | TEST POINT GROUNDED | ADJUST |
|---|---|---|---|
| 1 | 1-1' | A | L1 |
| 2 | 1-1' | B | L2 |
| 3 | 1-1' | C | L3 |
| 4 | 1-1' | D | L4 |
| 5 | 1-1' | OUTPUT TERM. 2-2' | L5 |
| 6 | 1-1' | NONE | L6 |
| 7 | 2-2' | E | L6 |
| 8 | 2-2' | F | L5 |
| 9 | 2-2' | C | L4 |
| 10 | 2-2' | A | L3 |
| 11 | 2-2' | G | L2 |
| 12 | 2-2' | INPUT TERM. 1-1' | L1 |

INVENTOR
W. E. BANTON
BY W. C. Parnell
ATTORNEY

United States Patent Office 2,991,436

Patented July 4, 1961

2,991,436

ADJUSTMENT OF FREQUENCY SENSITIVE TRANSMISSION NETWORKS

William E. Banton, North Andover, Mass., assignor to Western Electric Company, Incorporated, New York, N.Y., a corporation of New York Filed Sept. 11, 1958, Ser. No. 760,505

5 Claims. (Cl. 333—99)

This invention relates to the adjustment of frequency sensitive transmission networks and particularly to a method of and a system for adjusting filter networks having a plurality of elements requiring accurate tuning in order to produce a desired frequency response characteristic over a particular band of frequencies.

An object of this invention is a simple, yet precise, method of tuning such networks.

Another object is an inexpensive visual display system for accurately adjusting a plurality of frequency sensitive elements in complex filter networks.

Heretofore, complex electrical filter networks were tuned by the "resonance" or "transmission" methods requiring both expensive test facilities, such as highly stable, adjustable frequency sources and detectors which must be set to the prescribed frequencies for each of the series and shunting sections of the networks, as well as skilled personnel for carrying out the time-consuming individual tuning operations for each section. Furthermore, while these prior art methods permit adjusting the networks so that they will have prescribed attenuations, additional independent adjustments must be made for phase displacements through the various elements of the networks.

According to the general features of the invention, a sweep frequency signal is applied to visual display apparatus and a network to be adjusted and a similar reference or standard network having the desired frequency response characteristics are bridged alternately across the visual display apparatus so as to produce two traces corresponding to the frequency response characteristics of the two networks. Corresponding portions of the two networks are short-circuited while adjustments are made to isolated or non-short-circuited elements of the unit under test until the two traces coincide. Successive untuned elements are isolated with the tuned portions and thereupon tuned until all of the elements are tuned and the overall response characteristic is identical to that of the standard. The short-circuiting of shunting elements in the networks without short-circuiting the signal, and therefore the visual display apparatus, is due to the fact that the networks are connected in bridging rather than their normal series relation, in which case the signal would be transmitted through the neworks.

These and other features of the invention will be more fully understood from the following detailed description when taken in conjunction with the accompanying drawing, in which.

Figure 1:
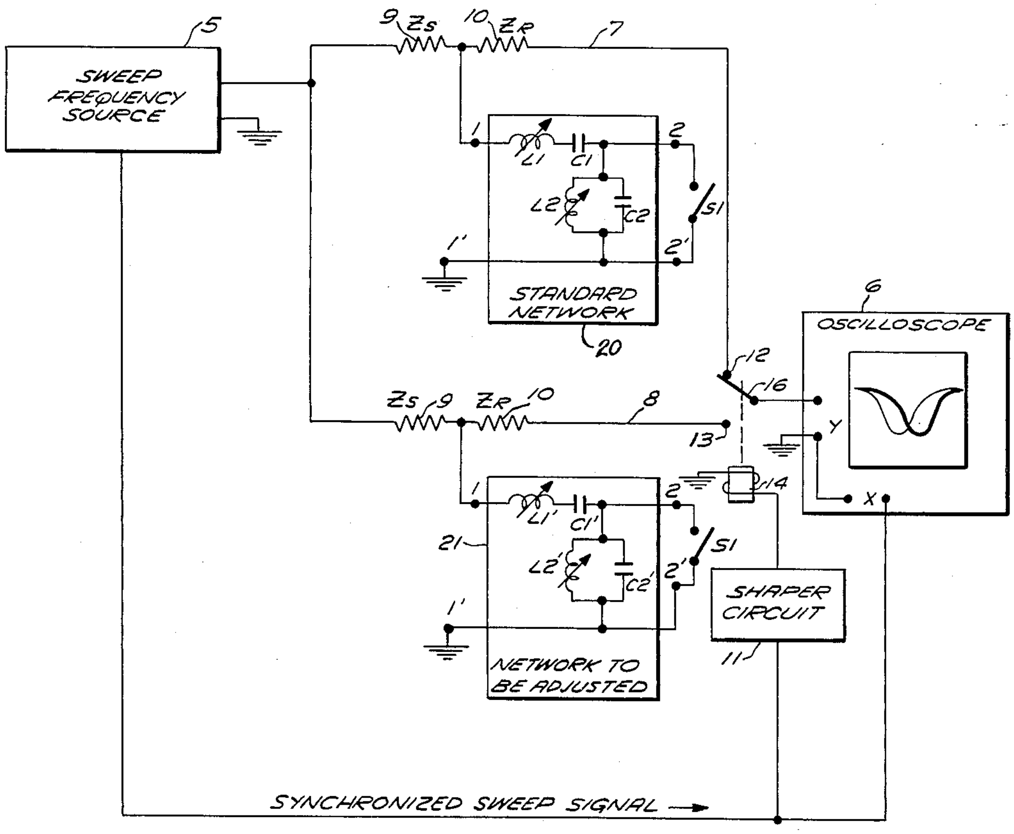
FIG. 1 is a schematic diagram of the test circuit.

Referring now to the drawing, the test system comprises a conventional sweep frequency source 5 for generating a repetitive constant amplitude signal varying in frequency between the predetermined low and high frequency limits as prescribed for the networks to be adjusted. The source also provides a synchronized sweep signal which is applied to the horizontal deflection plates of a cathode ray oscilloscope 6. The sweep frequency output from the generator 5 is transmitted through identical circuits 7 and 8 having prescribed sending and receiving line matching impedances 9 and 10, respectively, as may be required for the networks to be adjusted. The circuits 7 and 8 are connected to the contacts 12 and 13 of a fast-operating mercury relay 14 which operates in synchronism with the sweep frequency being energized from the source 5 through a pulse shaping circuit 11. The armature 16 is connected to the vertical deflection plates of the oscilloscope 6 so that the frequency characteristic waveforms of the circuits 7 and 8 will be displayed simultaneously on the screen of the oscilloscope due to the switching of the armature 16 between contacts 12 and 13.

A standard network 20, identical to the networks to be adjusted and being pre-adjusted such that it has the desired frequency response characteristics, is connected at the junction between impedance elements 9 and 10 of circuit 7 in bridging or parallel relation therewith and a network 21 to be adjusted is connected to the corresponding point in bridging relation in circuit 8. The networks are of the four-terminal type, each having two input terminals designated 1—1′ and two output terminals 2—2′. As shown in FIG. 1, the input terminals 1—1′ are connected in shunting relation with the circuits, the terminals 1′ being connected to ground potential as is the return side of the sweep frequency source and the oscilloscope. The output terminals 2—2′ have short-circuiting switches S1 connected across them so that the shunting impedance elements L2—C2 and L2′—C2′ of the networks may be short-circuited therewith.

In adjusting the network 21 of FIG. 1, the effects of the shunting impedance elements are eliminated from the signal paths provided by the two circuits by closing the switches S1 of both networks, thereby providing short-circuiting or by-passing paths around the shunting elements. The adjustable inductor element L1′ or network 21 is then tuned until the frequency response characteristic over the prescribed frequency band, as indicated by the traces, coincide. The reactance of the series impedance L1′—C1′ therefore is identical to that of L1—C1 of the standard network. After the series reactance has been properly tuned, the short-circuiting switches S1 are opened so that the response characteristic traces include the effects of the tuned series sections and the shunting impedance sections L2—C2 and L2′—C2′. The inductor L2′ of network 21 is thereupon adjusted until these traces coincide. With this method the tuning of the network 21 is made independent of frequency instability of the sweep frequency source 5, thereby eliminating the requirement for a high-quality stable generator as may be required for adjusting networks utilizing the aforementioned "resonance" or "transmission" methods. In addition, since the transmission characteristics are simultaneously displayed on the ocsillocsope screen, the skill required of the tester is reduced from that required for the aforementioned adjusting operations since the tester need only operate the short-circuiting switch and adjust the corresponding reactance elements until the traces on the screen coincide. No further adjustments are necessary; by matching characteristics, corrections are automatically made for phase displacements. It is to be noted that this method and test system eliminates the requirement for the operator to accurately set a frequency source and detector to an exact predetermined frequency for each of the elements to be tuned.

While the filters to be adjusted are normally connected in circuits such that a signal is transmitted through them, that is a signal is applied to the terminals 1—1′ and transmitted out of terminals 2—2′, the present test system, by employing a bridging connection across the signal input circuits to the deflection plates of the oscilloscope, makes it possible to short-circuit shunting paths in the filter such as L2—C2 and L2′—C2′ without short-circuiting the signal to the oscilloscope thereby permitting adjustment of all sections of the filters by this method.

Figures 2, 3:
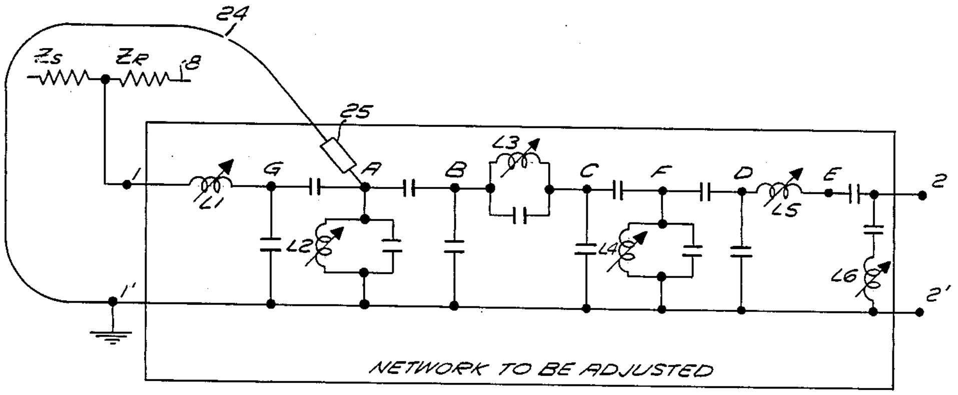
FIG. 2 is a schematic diagram of a typical complex cascaded band pass network which may be adjusted in the system of FIG. 1.
FIG. 3 is a chart outlining test procedures for tuning the filter of FIG. 2.

In tuning complex multiple-section, cascaded filter networks such as disclosed in FIG. 2 wherein a plurality of adjustable elements, L1—L2—L3—L4—L5 and L6, in various series and shunting portions of the networks are to be adjusted, a standard network similar to that shown in FIG. 2, is connected in the place of network 20 of FIG. 1 and a network to be adjusted is connected in the place of network 21. Switches S1 need not be used and if attached may be left open. Impedance elements 9 and 10 may be changed if required to match the prescribed impedance for the filters to be adjusted. In making the adjustments to the network of FIG. 2, the procedure outlined in FIG. 3, tests numbered 1 through 6 may be followed; that is, for test No. 1, in order to eliminate the effects of all the adjustable elements excepting the inductor L1, which is the closest adjustable element to the connected bridging terminals 1—1', a short-circuiting path is provided between grounded terminal 1' and point "A." This shunting path comprises a flexible conductor 24 and a test probe 25, one end of the conductor 24 being connected to the terminal 1' and the test probe 25 being held in contact with the junction "A" of the filter. A similar short-circuiting facility is provided for the standard network and when both networks have have been similarly short-circuited, the untuned inductor L1 of the network to be adjusted is tuned until the traces on the oscilloscope screen coincide. For test No. 2 the probes are moved to points "B" to include the next adjustable elements L2 with the tuned elements L1 and by-pass the remaining unadjusted elements from the circuits 7 and 8. Inductor L2 of the network to be adjusted is then tuned until the corresponding traces coincide. This procedure is repeated connecting the successive or next untuned elements with the tuned elements in accordance with tests Nos. 3, 4 and 5 making the tuning adjustments for each test. After inductor L5 has been adjusted, the short-circuit test probe 25 is removed so that the effects of the only remaining unadjusted inductor L6 are reflected in the signal trace of circuit 8, thereby permitting tuning the inductor L6 until the traces coincide.

This method of successively tuning the adjustable elements of the networks may be reversed, that is, the terminals 2—2' may be connected in bridging relation in circuits 7 and 8 instead of terminals 1—1' and the tests numbered 7 through 12 performed to successively tuned inductors L6 through L1. For extremely long and complex networks, since the tuning of the last element is dependent on the accurate tuning of all previous elements, it may be advantageous to tune several of the adjustable elements, for example, L1, L2 and L3 as with tests 1, 2 and 3, and then reverse the connections of the networks to the test circuits 7 and 8 and then tune inductors L6, L5 and L4 as with tests 7, 8 and 9. This procedure minimizes cumulative errors.

The only adjustable elements disclosed herein are inductors, since it is common practice to pretune or select desired capacitance values in filter manufacture, it is, of course, obvious that the invention applies to the tuning of capacitance or combination capacitance-inductance elements as well.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A method of adjusting two wire frequency sensitive transmission networks having adjustable elements, which comprises transmitting a sweep frequency signal alternately through two circuits to a signal sensing device, the first of said two circuits having an impedance serially connected with the signal sensing device, with a transmission network to be adjusted being in parallel across at least a portion of said impedance and said signal sensing device, the second of said two circuits having a second impedance and said signal sensing device, with a standard network having prescribed transmission characteristics of the same type as the network to be adjusted being in parallel with at least a portion of said second impedance and said signal sensing device, isolating corresponding terminal portions of both the transmission and standard networks opposite the first and second impedances to eliminate effects therefrom on the transmitted signal, and tuning the adjustable elements in the other portions of the network to be adjusted to make the response characteristics of the signal transmitted through the two circuits substantially identical.

2. A method of adjusting two wire frequency sensitive transmission networks having adjustable elements, which comprises transmitting a sweep frequency signal alternately through two circuits, the first said two circuits having in series an impedance and a cathode ray oscilloscope, said frequency sensitive transmission network being in parallel with at least a portion of said impedance and said oscilloscope, the second of said two circuits having in series a second impedance and said oscilloscope with a standard network of the same type as the network to be adjusted and having prescribed transmission characteristics being in parallel with at least a portion of said second impedance and said signal sensing device, producing simultaneous traces of the transmission characteristic waveforms for the two circuits on the screen of said oscilloscope, short-circuiting corresponding terminal portions of the networks opposite the first and second impedances to eliminate their effects on the transmitted signal, and tuning the adjustable elements in the remaining portion of the network to be adjusted to make the oscilloscope signal traces substantially coincide.

3. A method of adjusting a frequency sensitive transmission network having an adjustable series impedance element and an adjustable shunting impedance element, which comprises, transmitting a sweep frequency signal alternately through a first circuit having bridged in parallel therewith a standard network of the type to be adjusted with prescribed transmission characteristics and a second circuit having bridged in parallel therewith the network to be adjusted, bridging an oscilloscope across the input of the standard network and the input of the network to be adjusted, the oscilloscope being alternately switchable between the network inputs, producing simultaneous traces of the transmission characteristic waveforms for the two circuits on the screen of a cathode ray oscilloscope, short-circuiting the shunting impedances of the two networks, tuning the adjustable series element of the network to be adjusted to make the signal traces substantially coincide, removing the short circuits, and tuning the adjustable shunting element to make the signal traces substantially coincide.

4. A method of adjusting a complex filter network having a pair of input terminals, a pair of output terminals, and a plurality of sections with adjustable elements therein, which comprises, transmitting a sweep frequency signal alternately through a circuit having a pair of the terminals of a standard network of the type to be adjusted and having prescribed transmission characteristics connected in parallel therewith, and another circuit having the corresponding pair of terminals of the network to be adjusted connected in parallel therewith, bridging an oscilloscope across the input of the standard network and the input of the network to be adjusted, the oscilloscope being alternately switchable between the network inputs, producing simultaneous traces of the transmission characteristic waveforms for the two circuits on the screen of a cathode ray oscilloscope, short-circuiting corresponding terminal portions of the two filters adjacent the first adjustable elements located closest to the connected pairs of terminals so as to by-pass all except the first adjustable elements of the filters, tuning the first adjustable element of the filter to be adjusted to make the signal traces coincide, successively short-circuiting corresponding portions of the two filters adjacent the tuned elements and the next adjustable elements so as to by-pass all except the tuned and next adjustable elements, and for each short-circuiting condition, tuning said next adjustable element of the filter to be adjusted until the corresponding signal traces coincide.

5. A test system for adjusting a plurality of tunable elements in a frequency sensitive two line transmission network, which comprises, a standard network of the type to be adjusted and having a prescribed frequency response characteristic, a sweep frequency signal source, first and second transmission circuits, means connecting the standard network in parallel relation with the first circuit, means connecting a network to be adjusted in parallel relation with the second circuit, an oscilloscope connectable across the inputs of the standard network and the network to be adjusted, means for alternately connecting the first and second circuits between the sweep frequency source and the oscilloscope to display simultaneous traces corresponding to the response characteristics of the two circuits, and means for selectively short-circuiting corresponding terminal sections in the two networks to effectively remove said terminal sections from the signal paths of the two transmission circuits so that non-short-circuited elements may be adjusted until the traces of the circuit with the network to be adjusted substantially coincide with the corresponding traces of the circuit with the standard.

References Cited in the file of this patent

UNITED STATES PATENTS

| | | |
|---|---|---|
| 1,644,004 | Zobel | Oct. 4, 1927 |
| 1,683,127 | Davis | Sept. 4, 1928 |
| 1,977,435 | Farnham | Oct. 16, 1934 |
| 1,985,042 | Lane | Dec. 18, 1934 |
| 2,186,184 | Tubbs | Jan. 9, 1940 |
| 2,252,058 | Bond | Aug. 12, 1941 |
| 2,396,540 | Stansfield | Mar. 12, 1946 |

FOREIGN PATENTS

| | | |
|---|---|---|
| 431,731 | Great Britain | July 15, 1935 |
| 885,428 | Germany | Aug. 6, 1953 |